United States Patent Office 3,321,534
Patented May 23, 1967

3,321,534
NICKEL CATALYST
Alfred Landgraf, Limburgerhof, Pfalz, Hans Moell, Ludwigshafen (Rhine), Horst Kerber, Mannheim, and Friedrich Wodtcke, Fanz L. Ebenboech, and Leopold Hupfer, Ludwigshafen (Rhine), Germany, assignors to Badische Anilin- & Soda-Fabrik Aktiengesellschaft, Ludwigshafen (Rhine), Germany
No Drawing. Filed Dec. 29, 1964, Ser. No. 422,012
Claims priority, application Germany, Jan. 2, 1964, B 74,876
4 Claims. (Cl. 260—638)

This invention relates to a process for the production of nickel silicate catalysts containing molybdenum which are particularly suitable for the hydrogenation of sulfur-containing mixtures of aldehydes, ketones and esters obtained from olefins by reaction with carbon monoxide and hydrogen in oxo synthesis to the corresponding alcohols.

Various catalysts have already become known for the hydrogenation of mixtures containing aldehydes obtained by oxo synthesis.

It is known that such catalysts may be prepared by kneading basic copper carbonate in paste form with carriers, such as diatomaceous earth or pumice powder, activating the resultant paste by incorporating magnesium carbonate, magnesium hydroxide or magnesium oxide, and processing it into a catalyst composition with kaolin, bentonite or clay, molding it into strands and reducing it with hydrogen at elevated temperature.

Another prior art catalyst is obtained by precipitation from a hot solution containing nickel nitrate and aluminum nitrate with hot sodium carbonate solution and then stirring in diatomaceous earth. Such a catalyst may contain, prior to reduction, for example 10% of nickel oxide, 10% of diatomaceous earth, 5% of aluminum oxide and 13% of water.

A catalyst has also become known which has been obtained by coprecipitation of copper chromate and barium chromate from aqueous solution, thermally decomposing the dried precipitate in small portions and finally treating it with acetic acid. The dried product is mixed with aluminum powder in the ratio of 4:1, molded into pellets and activated and solidified in a stream of hydrogen at 450° C. Production of this copper chromite catalyst is troublesome because the copper-barium chromate may be thermally decomposed in small portions only.

Another prior art catalyst having 20% by weight of cobalt is obtained by impregnating pumice with cobalt nitrate solution. After reduction with hydrogen it is used for hydrogenation of aldehydes.

Aldehydes formed in the oxo synthesis are hydrogenated to the corresponding alcohols in good yields by the said prior art catalysts, but a decisive disadvantage of these catalysts is that ketones obtained in the oxo synthesis at the same time are not or not appreciably hydrogenated. These ketones are troublesome in the following distillation of the hydrogenated reaction mixture because they form with the alcohols azeotropic mixtures and consequently can only be separated with difficulty from the desired alcohols. The prior art catalysts have the further disadvantage that their compressive strength and lateral break resistance are not always adequate for practical requirements.

It is an object of the present invention to provide a catalyst for the hydrogenation of reaction mixtures obtained by the oxo synthesis which does not have the abovementioned disadvantages.

This object is achieved with a catalyst which has been prepared by adding to an aqueous solution prepared from waterglass and sodium molybdate and which is 0.5 to 3 molar with respect to silicon and has a sodium:silicon ratio of 0.7:1 to 7:1 and a molybdenum:silicon ratio of 0.04:1 to 0.2:1, at a temperature of from 0° to 100° C. while stirring such an amount of a 1 to 3 molar nickel salt solution that the amount of nickel added is from 10% by weight less up to 10% by weight more than the amount equivalent to the sodium content of the solution, separating the precipitate obtained from the solution, molding it, optionally calcining it at a temperature of from 250° to 400° C. and then reducing it with hydrogen at a temperature of from 300° to 500° C., preferably 350° to 400° C.

Waterglass solutions, preferably those having a commercial concentration (38° Bé.), or solid water-soluble waterglass may be used for the production of the solution. The desired ratio of sodium to silicon may be adjusted by adding appropriate amounts of caustic soda solution. It is preferred to use nickel nitrate as the nickel salt, but other readily soluble nickel salts, such as the chloride, sulfate or acetate, are also suitable. A portion of the nickel nitrate may be replaced by the equivalent amount of magnesium salts. The magnesium salts may advantageously be added to the solution containing waterglass prior to adding the nickel salt, but may also be added together with the nickel salt. The amount of magnesium salts is chosen as a maximum so that the ratio of magnesium:silicon is about 0.7:1. Addition of magnesium results in an increase in the activity and the break resistance of the finished catalyst.

The precipitate which forms after the nickel salt solution has been added is separated from the solution and washed with water. It is dried, for example at 100° C., molded, for example into pellets, and then advantageously calcined at a temperature of 250° to 400° C.

When the temperature at which addition of the nickel salt solution to the waterglass-containing solution is below 30° C., it is advantageous to heat the reaction mixture subsequently at a temperature of from 50° to 100° C. for some time, for example one hour. This is the case when precipitation has been carried out at temperatures of, for example, 20° C. or less.

Compressive strength of the catalyst prepared according to this invention is about 500 to 700 kg./sq. cm. and lateral breaking resistance is about 18 to 23 kg., measured by applying a blade 0.3 cm. in thickness perpendicularly to the axis of the cylinder. Catalysts prepared according to this invention are distinguished particularly by their high activity which is retained even after prolonged continuous operation. Moreover when they are used hydrogenation proceeds more uniformly without the formation of temperature pockets which may give rise to undesirable side reactions. Another advantage of the process according to this invention is that the precipitate may also be molded by screw extrusion, which is much more economical than pelleting, and the catalyst even then has a long life.

The following examples will further illustrate the invention.

*Example 1*

2.1 liters of a 1.5 molar sodium silicate solution ($NaH_3SiO_4$) is mixed with a 1 molar sodium molybdate solution ($Na_2MoO_4$) and boiled. 1.8 liters of a 1 molar nickel nitrate solution ($Ni(NO_3)_2$) is dripped into the boiling mixture during the course of one hour. The ratio of sodium to silicon in the reaction solution is 1.19:1 and the ratio of molybdenum to silicon is 0.095:1. The reaction solution also contains nickel in an amount which is 4% below the amount equivalent to the sodium content. The precipitate formed is washed with at least about 5 liters of water, after the reaction mixture has cooled. The water still adhering to the precipitate is then evaporated in a kneader to such an extent that a plastic composition remains and this is then molded into strands. The strands are calcined for twelve hours at 350° C. They contain 34% by weight of nickel oxide, 6% by weight of molybdenum trioxide, 48% by weight of silicon dioxide and 0.2% by weight of sodium oxide; the remainder is combined water. The calcined strands are then reduced for twelve hours at 400° C. in a stream of hydrogen.

*Example 2*

1.5 liters of a 1.5 molar magnesium nitrate solution is mixed with 1 liter of a 0.5 molar sodium molybdate solution and then 7.5 liters of a sodium silicate solution is added which is 4.5 molar in sodium and 0.7 molar in silicon. 5 liters of a 3 molar nickel nitrate solution is added to the said mixture while stirring at room temperature (20° C.) during the course of ninety minutes. Precipitation is carried out so that the pH value is always in the weakly alkaline region. The whole is then heated for about an hour at 50° C., so that a pH value of 6.8 is set up. The pH value is then adjusted to 7.5 by adding a saturated sodium carbonate solution. The ratio of sodium to silicon in the precipitation solution is 7:1, the ratio of molybdenum to silicon is 0.095:1 and the ratio of magnesium to silicon is 0.43:1. The deficiency in the nickel and magnesium equivalents (with reference to the sodium equivalents contained in the solution) is about 6%. The reaction mixture is cooled and the precipitate is filtered off and washed with water until the filtrate has a neutral reaction. The precipitate is then dried at 100° C. for forty-eight hours and, with an addition of 2% of graphite, made into pellets. The pellets are then calcined for twenty-four hours at 300° C. They then have the following composition: 51.0% by weight of nickel oxide, 3.3% by weight of magnesium oxide, 4.5% by weight of molybdenum trioxide, 30.0% by weight of silicon dioxide, 0.2% by weight of sodium oxide and about 11.0% by weight of combined water. The pellets are reduced with hydrogen for twelve hours at 350° C. before being used as catalyst.

*Example 3*

4 liters of a sodium silicate solution, which is 3.3 molar in sodium and 0.5 molar in silicon, has added to it 400 milliliters of a 1 molar sodium molybdate solution ($Na_2MoO_4$) and is heated to 50° C. 3.5 liters of a 2 molar nickel nitrate solution ($Ni(NO_3)_2$) is added to the mixture at 50° C. with stirring, a pH of about 7.5 being maintained toward the end of the reaction by simultaneously adding a 1 molar sodium carbonate solution ($Na_2CO_3$). The ratio of sodium to silicon in the reaction solution is 7:1 and the ratio of molybdenum to silicon is 0.2:1. The reaction solution is stirred for another half hour. The precipitate is then filtered off and washed with water until the filtrate is free from nitrate. The filtrate is dried and, with an addition of 1% by weight of graphite, made into pellets. The pellets are then calcined for twenty-four hours at 300° C. They then have the following composition: 67.2% by weight of nickel oxide, 15.3% by weight of silicon dioxide, 7.4% by weight of molybdenum trioxide, 0.2% by weight of sodium oxide and about 8.9% by weight of combined water. The pellets are reduced with hydrogen for fifteen hours at 350° C. before being used as catalyst.

The activity of the catalyst prepared according to Example 2 is tested using a product which has been formed by hydroformylation of propylene, carbon monoxide and hydrogen in the presence of a cobalt salt as catalyst and which, after a portion of the n-butyraldehyde has been distilled off, has the composition in percent by weight given in the following table in the column headed "Feed." When this reaction mixture is passed with 10% by weight of water added over the catalyst at a space velocity of 0.5 to 1.0 liter per liter of catalyst per hour at 180° C., a product is formed of which the composition in percent by weight is given in the table under the heading "Discharge."

TABLE

| Components | Feed | Discharge |
|---|---|---|
| Isobutyraldehyde | 32.1 | |
| n-Butyraldehyde | 32.1 | |
| Isobutyl formate | 1.2 | |
| Isobutanol | 7.5 | 42.4 |
| n-Butyl formate | 2.6 | |
| n-Butanol | 12.8 | 51.2 |
| Diisopropylketene | 0.25 | |
| n-Butyl isobutyl ether | 0.03 | 0.04 |
| n-Propyl isopropyl ketone | 0.97 | 0.01 |
| Di-n-butyl ether | 0.1 | 0.2 |
| Substances boiling above 142° C., mainly butyric esters and 2-ethylhexanol | 10.35 | 5.0 |
| Low boiling point hydrocarbons, etc. | | 1.15 |

It may be seen from the table that the n-butyraldehyde and isobutyraldehyde in the feed is hydrogenated completely, and the butyl formates and butyric esters are hydrogenated substantially, to the corresponding butanols. The dipropylketones contained in the initial mixture are converted to the corresponding alcohols down to a remainder which is less than 0.01%. The low boiling point hydrocarbons recited in the hydrogenated reaction mixture are formed by partial decomposition of the butyl formates and from the substances boiling above 142° C. contained in the initial mixture.

When a catalyst prepared according to Example 1 is used for the hydrogenation instead of the catalyst described in Example 2, about the same results are obtained initially. It is only after the operating period is more than 2,000 hours and at loadings of more than 1,000 liters of oxo product per liter of catalyst per hour are used that the catalyst with the higher nickel content according to Example 2 is superior to the catalyst having the lower content of nickel described in Example 1. Thus when using the catalyst described in Example 2, the $C_7$-ketones are so substantially hydrogenated after an operating period of 3,000 hours and a loading of 1,500 liters of oxo product per liter of catalyst per hours that their content in the hydrogenated product is less than 0.1% by weight. In contrast, the content of $C_7$-ketones in the hydrogenated product when using a catalyst prepared according to Example 1 is about 0.15% by weight.

The activity of the catalyst prepared according to Example 3 is equal to that of the catalyst prepared according to Example 1.

We claim:

1. A nickel-containing catalyst prepared by mixing a solution of sodium silicate and sodium molybdate in such proportions and such concentrations that a solution is obtained which is 0.5 to 3 molar in silicon and has an atomic ratio of sodium to silicon of from 0.7 to 7:1 and an atomic ratio of molybdenum to silicon of 0.04:1 to 0.2 to 1, subsequently adding to said solution while stirring such an amount of a 1 to 3 molar nickel salt solution that the amount of nickel added is from 10% by weight less up to 10% by weight more than the amount of nickel equivalent to the amount of sodium contained in the solution, separating the resultant precipitate from the solution, molding the precipitate and reducing it with hydrogen at temperatures of from 300° to 500° C.

2. In a process for the catalytic hydrogenation of sulfur-containing mixtures of aldehydes, ketones and esters to the corresponding alcohols, said mixtures being obtained in oxo synthesis from olefins by reaction with carbon monoxide and hydrogen, the improvement which comprises using a catalyst which has been prepared by mixing a solution of sodium silicate and sodium molybdate in such proportions and such concentrations that a solution is obtained which is 0.5 to 3 molar in silicon and has an atomic ratio of sodium to silicon of from 0.7 to 7:1 and an atomic ratio of molybdenum to silicon of 0.04:1 to 0.2 to 1, subsequently adding to said solution while stirring such an amount of a 1 to 3 molar nickel salt solution that the amount of nickel added is from 10% by weight less up to 10% by weight more than the amount of nickel equivalent to the amount of sodium contained in the solution, separating the resultant precipitate from the solution, molding the precipitate and reducing it with hydrogen at temperatures of from 300° to 500° C.

3. A process as claimed in claim 2 wherein the precipitate is molded and then calcined at a temperature of 250° to 400° C. prior to reduction.

4. A process as claimed in claim 2 wherein a portion of the nickel salt solutions is replaced by the equivalent amount of magnesium salt solution, the maximum amount of magnesium salt solution being such that the ratio of magnesium to silicon is not more than 0.7:1.

References Cited by the Examiner

UNITED STATES PATENTS

| | | | |
|---|---|---|---|
| 1,143,332 | 6/1915 | Sulzberger | 252—452 X |
| 1,450,174 | 3/1923 | Granichstadten et al. | 252—452 |
| 2,687,370 | 8/1954 | Hendricks | 252—458 X |
| 2,917,566 | 12/1959 | Carr | 252—459 X |

DANIEL E. WYMAN, *Primary Examiner.*

BENJAMIN HENKIN, *Examiner.*

E. J. MEROS, C. F. DEES, *Assistant Examiners.*